United States Patent [19]

Nakagami et al.

[11] Patent Number: 5,339,416
[45] Date of Patent: Aug. 16, 1994

[54] DIGITAL PROCESSING APPARATUS FOR SIMULTANEOUSLY PROCESSING TWO OR MORE JOBS BY SWITCHING BETWEEN TWO OR MORE INSTRUCTION ADDRESS REGISTER

[75] Inventors: Taro Nakagami, Kanagawa; Akira Sakamoto, Tokyo, both of Japan

[73] Assignee: Sony Corporation, Tokyo, Japan

[21] Appl. No.: 4,628

[22] Filed: Jan. 14, 1993

Related U.S. Application Data

[63] Continuation of Ser. No. 475,012, Feb. 5, 1990, abandoned.

[30] Foreign Application Priority Data

Feb. 28, 1989 [JP] Japan .................................. 1-46752

[51] Int. Cl.$^5$ .......................... G06F 9/00; G06F 9/38; G06F 9/44
[52] U.S. Cl. ........................... 395/650; 395/550; 364/231.4; 364/231.6; 364/270.2; 364/271.3; 364/281.4; 364/DIG. 1
[58] Field of Search ............... 395/800, 425, 325, 375, 395/650, 775, 725, 650, 550

[56] References Cited

U.S. PATENT DOCUMENTS

| | | | |
|---|---|---|---|
| 4,096,564 | 6/1978 | Inose et al. ........................ | 395/725 |
| 4,197,579 | 4/1980 | Otis, Jr. et al. .................... | 395/375 |
| 4,288,860 | 9/1981 | Trost ................................. | 395/425 |
| 4,525,783 | 6/1985 | Pischke et al. ................... | 364/431.11 |
| 4,577,282 | 3/1986 | Caudel et al. ..................... | 395/800 |
| 4,800,483 | 1/1989 | Yamamoto et al. ............... | 395/325 |
| 4,945,510 | 7/1990 | Maeda et al. ...................... | 395/575 |
| 4,965,718 | 10/1990 | George et al. .................... | 395/425 |
| 5,036,475 | 7/1991 | Ueda ................................. | 364/518 |
| 5,081,575 | 1/1992 | Hiller et al. ...................... | 395/325 |

OTHER PUBLICATIONS

Proceedings of the IEEE—IECEJ—ASJ International Conference on Acoustics, Speech, and Signal Processing, vol. 1/4, Nov. 7, 1986, Tokyo, Japan, pp. 409–412; T. Nishitani et al. 'Advanced Single-Chip Signal Processor'.
Patent Abstracts of Japn, vol. 11, No. 56 (P-549)(2503), Feb. 20, 1987 & JP-A-61 221 844 (Sharp Corp.), Oct. 2, 1986.
Patent Abstracts of Japan, vol. 3, No. 156 (E-161), Dec. 21, 1979 & JP-A-54 138 354 (Oki Denki Kogyo K.K.), Oct. 26, 1979.
Electronique Industrielles, No. 16, Nov. 1987, Paris, France, pp. 34–40; Jean-Guy Bonneault: 'Traitement Numerique du Signal en Temps Réel sur le Bus VME'.
1957 Western Computer Proceedings Feb. 26, 1957, U.S. pp. 156–160; J. W. Forgie: 'The Lincoln TX-2 Input–Output System'.

Primary Examiner—Alyssa H. Bowler
Assistant Examiner—Alpesh M. Shah
Attorney, Agent, or Firm—Limbach & Limbach

[57] ABSTRACT

A digital signal processing apparatus according to the present invention includes two or more address registers associated with at least one of an instruction memory, a data memory, or a coefficient memory and two or more data registers associated with a computing block, and these two or more registers are duty cycled switched between different jobs being simultaneously processed by the computing block to enable efficient processing on a single chip of jobs that can be processed with different processing speeds, such as jobs suited for high speed processing or low speed processing.

9 Claims, 2 Drawing Sheets

DIGITAL PROCESSING APPARATUS FOR SIMULTANEOUSLY PROCESSING TWO OR MORE JOBS BY SWITCHING BETWEEN TWO OR MORE INSTRUCTION ADDRESS REGISTER

This is a continuation of application Ser. No. 07/475,012 filed on Feb. 5, 1990, now abandoned.

BACKGROUND OF THE INVENTION

1. Field of the Invention

This invention relates to a digital signal processing apparatus for processing digital signals, such as digital audio signals.

2. Description of the Prior Art

Recently, it has become customary to perform various digital signal processing operations, including numerical computations, such as computations for digital filters, fast Fourier transform (FFT) or correlative functions, for digital signals such as digitized audio or video signals, on a real-time basis, and a variety of digital signal processing apparatus, known as DSP, have been evolved to perform such real time operations. In general, a DSP includes a computing block to perform arithmetic operations, such as multiplication or addition, an instruction RAM for writing a microprogram stating the signal processing sequence, a data RAM for transient data storage, and a coefficient RAM for storing coefficients employed in the arithmetic operation in the computing block.

Thus, under the control of the microprogram, written in the instruction RAM, data are read out from the data RAM and the coefficient RAM, and an arithmetic operation is performed by the computing block for processing digital signals.

However, since a conventional DSP is mainly designed for high-speed signal processing, it is customary to perform a single job on the DSP. When plural jobs are executed in parallel, especially at different speeds, the program contents become complicated in order to realize such parallel processing in one program on a one-chip DSP, otherwise wasteful execute cycles may be generated at the transition point from one job to another.

On the other hand, when plural jobs are executed using plural DSPs, data exchange between the DSPs becomes complicated. When the DSPs are connected in series objectionable time delays may be produced. Moreover, the use of plural DSPs results in an increased mounting space and elevated costs.

OBJECTS AND SUMMARY OF THE INVENTION

It is a principal object of the present invention to provide a digital signal processing apparatus whereby plural jobs can be executed on one chip.

According to the present invention, there is provided a digital signal processing apparatus comprising at least an instruction memory, a data memory and a computing block, wherein two or more address registers are associated with at least one of the instruction memory or the data memory for returning the processing from a current job to a previous job by supplying address data for the previous job, and two or more data registers are associated with the computing block and wherein the two or more address registers or data registers are duty cycle switched between one or more instruction cycles during multiple job processing to allow multiple jobs to be simultaneously processed.

In the preferred embodiment of the present invention, there is also provided a coefficient memory, and two or more address registers are associated with the coefficient memory and the two or more address registers are also duty cycle switched in response to job switching.

With the above described digital signal processing apparatus, two or more address registers are provided in association with at least one of the instruction memory, the data memory or a coefficient memory, if the apparatus is provided additionally with such coefficient memory, and two or more data registers are provided in association with the computing block, and these two or more registers are simultaneously switched by switching control means in response to job switching to enable efficient execution on one chip of plural jobs suited to processing at different processing speeds.

In this manner, it becomes possible to avoid an increase in the required mounting space or costs otherwise caused when plural jobs are allotted to plural chips, as well as to avoid time delay otherwise caused when plural jobs are performed on plural DSPs connected in tandem.

DETAILED DESCRIPTION OF PREFERRED EMBODIMENT

Figure 1:
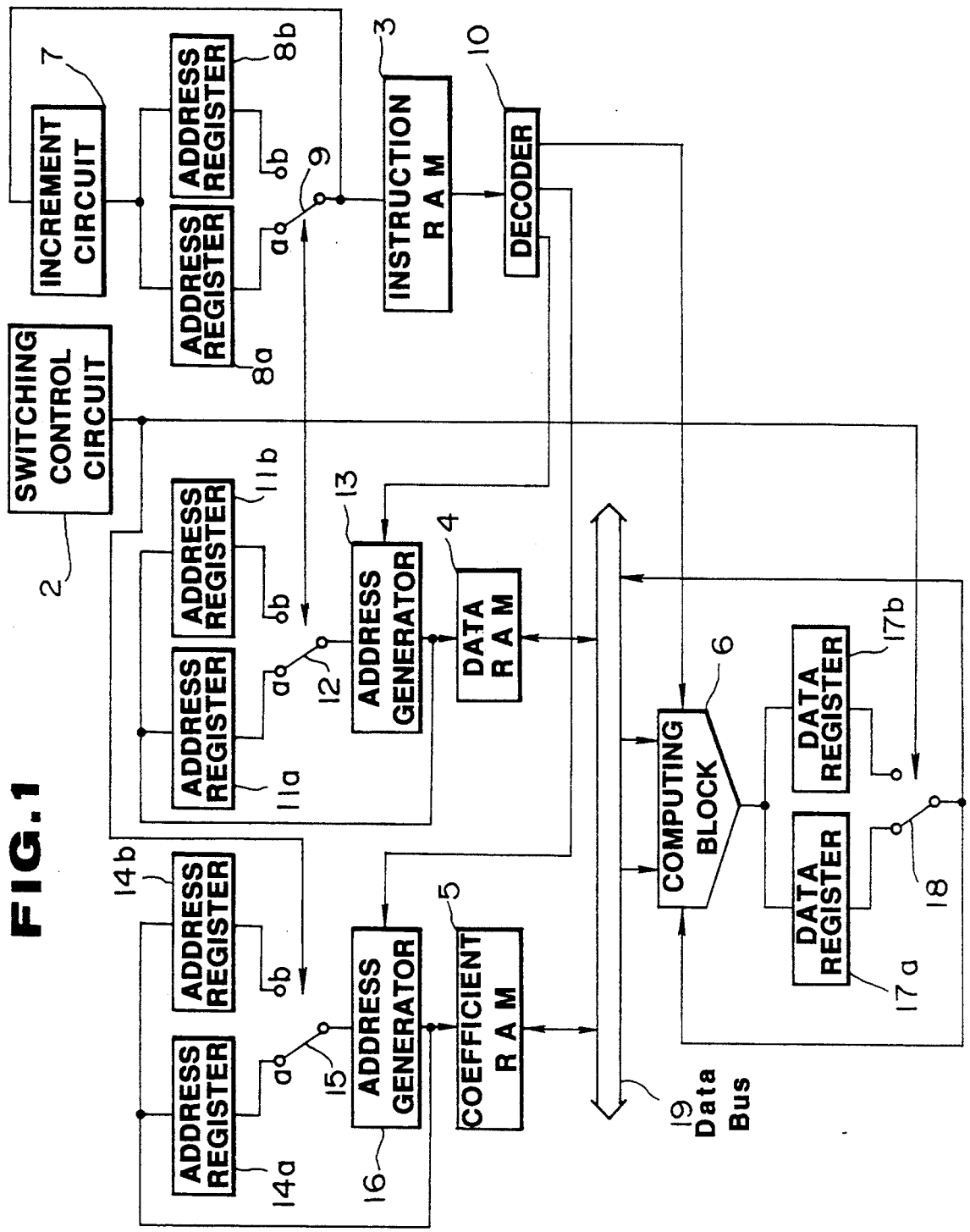
FIG. 1 is a schematic block diagram showing an embodiment of a digital signal processing apparatus according to the present invention.

By referring to the drawings, an embodiment of a digital signal processing apparatus according to the present invention will be explained in detail.

With the present illustrative embodiment, two address registers are associated with each of an instruction RAM 3, a data RAM 4 and a coefficient RAM 5, while two data registers are also associated with the computing block 6 to enable parallel execution of two different jobs. However, three or more registers can also be provided to enable parallel execution of three or more different jobs.

FIG. 1 is a schematic block diagram showing an embodiment of a digital signal processing apparatus according to the present invention. The digital signal processing apparatus (DSP) is comprised of the instruction RAM 3, the data RAM 4, the coefficient RAM 5 and the computing block 6.

Address registers 8a, 8b, an increment circuit 7, and a decoder 10 are connected to instruction RAM 3 and these address registers 8a, 8b are connected to fixed terminals a, b of a changeover switch 9, respectively. A selected one of the addresses from these address registers 8a, 8b is transmitted to the instruction RAM 3 after switching by the changeover switch 9.

Instruction data stored in the instruction RAM 3 are decoded by the decoder 10, and are supplied as various kinds of control signals to, for example, an address generator 13 for the data RAM, an address generator 16 for the coefficient RAM, and the computing block 6. The output address from the changeover switch 9 is supplied to the increment circuit 7, which increment the input address by, e.g. one and is supplied to the address registers 8a, 8b again. The increment circuit 7 and the address registers 8a, 8b thus make up a so-called program counter.

Address registers 11a, 11b and the address generator 13 are connected to the data RAM 4 and the address registers 11a, 11b are connected to fixed terminals a, b of a changeover switch 12, respectively. According to the instruction read out from the instruction RAM 3, the address generator 13 generates a new address for the data RAM 4 independently or based on the current address transmitted from one of the address registers 11a, 11b selected by the changeover switch 12 to the address generator 13, and the generated new address is transmitted to the data RAM 4 to effect data accessing. The new address for the data RAM 4 generated by the address generator 13 is transmitted to the address registers 11a, 11b, and is used as a reference address of the relative address to effect the next data accessing of data RAM 4.

Address registers 14a, 14b and the address generator 16 are connected to the coefficient RAM 5 and the address registers 14a, 14b are connected to fixed terminals a, b of a changeover switch 15, respectively. According to the coefficient read out from the coefficient RAM 5, the address generator 16 generates a new address for the coefficient RAM 5 independently or based on the current address transmitted from one of the address registers 14a, 14b selected by the changeover switch 15 to the address generator 16, and the generated new address is transmitted to the coefficient RAM 5 to effect data accessing. The new address for the coefficient RAM 5 generated by the address generator 16 is transmitted to the address registers 14a, 14b, and is used as a reference address of the relative address to effect the next data accessing of coefficient RAM 5.

Data from the data RAM 4 and the coefficient RAM 5 are supplied to a computing block 6 by way of a data bus 19, and subjected to an arithmetic operation, such as addition or multiplication according to the instruction read out from instruction RAM 3 before being transmitted to computed data registers 17a, 17b. The outputs from the computed data registers 17a, 17b are selected by a changeover switch 18 so as to be transmitted back to the computing block 6 or to the data bus 19.

The changeover switches 9, 12, 15 and 18 are controlled simultaneously by a changeover control circuit 2 as will later be explained in further detail.

Figure 2:
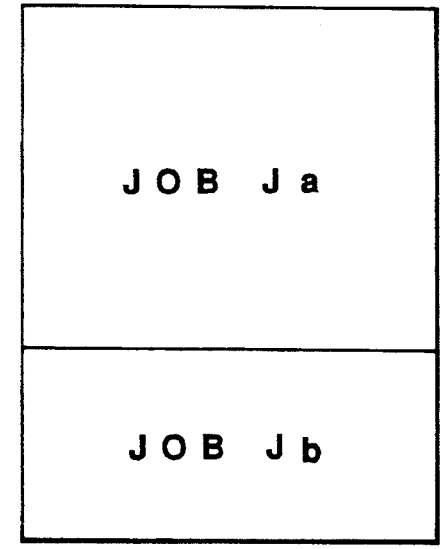
FIG. 2 shows an example of a multiple job program written in an instruction RAM of the apparatus shown in FIG. 1.

The so-called microprogram, written in the instruction RAM 3, is classed into different jobs Ja, Jb, as shown in FIG. 2, wherein the instruction codes for these jobs Ja and Jb are written in the instruction memory 3 in a memory area bearing memory addresses n, n+1, n+2, . . . and a memory area bearing memory addresses m, m+1, m+2, . . . , respectively.

With the above described digital signal processing apparatus or DSP, the changeover circuit 2 operates in response to instruction cycle clocks for transmitting to the changeover switches 9, 12, 15 and 18 changeover control signals which will switch two of three instruction cycle periods to the job Ja and the remaining instruction cycle to the job Jb so that the movable contacts of the changeover switches are biased to the fixed contact a during two sequential instruction cycles and to the fixed contact b during the following instruction cycle. It will be understood that although changeover switches 9, 12, 15, and 18 are represented in a mechanical form in the figure, they are actually high speed electronic switches.

At this time, the program having the job Ja and the job Jb written in the instruction RAM 3 as shown in FIG. 2 is operated with the three instruction periods as shown in Table 1, so that the two sequential instruction cycles are allotted to the job Ja and the remaining instruction cycle is allotted to the job Jb, as shown in Table 1, to enable parallel separate execution of jobs with different processing speeds.

TABLE 1

| processing sequence | memory addresses | jobs |
| --- | --- | --- |
| 1 | n | Ja |
| 2 | n + 1 | Ja |
| 3 | m | Jb |
| 4 | n + 2 | Ja |
| 5 | n + 3 | Ja |
| 6 | m + 1 | Jb |
| 7 | n + 4 | Ja |
| . | . | . |
| . | . | . |
| . | . | . |

That is, when the address changeover switch 9, associated with the instruction RAM 3, is switched to the side of the fixed contact a during two of the three instruction cycles, the instruction codes of the job Ja written in the memory addresses n, n+1, n+2, . . . of the instruction RAM 3, are sequentially read. On the other hand, when the switch 9 is switched to the side of the movable contact b during the remaining one instruction cycle, the instruction codes for the job Jb written in the memory addresses m, m+1, m+2, . . . of the instruction RAM 3 are read out sequentially. The above described operational sequence is repeated at every three instruction cycles so that the jobs Ja and Jb are executed in parallel time-divisionally. The processing speed for the job Ja is twice that for the job Jb so that plural jobs with different processing speeds can be executed efficiently.

When it is desired to execute the jobs Ja and Jb with different coefficients or data, it suffices to provide each of the two address registers 11a, 11b, 14a and 14b or data registers 17a, 17b, as shown in FIG. 1, these being switched by the changeover switches 12, 15 or in 18 response to job switching.

Although the DSP having the coefficient RAM 5 has been explained in the above embodiment, the present invention can also be applied to the DSP in which coefficient data are included in the operand portions of the instruction codes and hence the coefficient RAM is not in use. Two or more address registers or data registers can be provided for one of the instruction RAM 3, the data RAM 4 or the coefficient RAM 5, or the computing block 6, while only one register can be provided for the remaining RAMs or the computing block. The number of the jobs processed in parallel, the job switching periods or the number of cycles allotted to the jobs can also the selected freely. The instruction RAM 3, the data RAM 4 or the coefficient RAM 5 can be replaced by corresponding ROMs or other memories.

What is claimed is:

1. A digital signal processing apparatus for simultaneously processing two or more jobs and comprising at least an instruction memory, a data memory and a computing block, which operates according to instruction clocks cyclicly supplied from a source, operatively connected to each other and wherein the improvement resides in that:

(a) two or more instruction address registers are associated with the instruction memory for separately supplying instruction address data for different jobs; and (b) switching means supplied with the instruction clocks for cyclicly switching between the two or more instruction address registers according to a predetermined pattern of the instruction clocks to cyclicly connect the instruction address registers to the instruction memory for cyclicly supplying instruction address data from a current job and then one or more previous jobs to the instruction memory to enable processing by the computing block to by cyclicly switched between the current job and one or more previous jobs, wherein the jobs to be processed require different processing times and further wherein the predetermined pattern of instruction clocks is selected so that the switching means connects the instruction memory to a first one of the instruction address registers for a first continuous period of N instruction clocks for a job requiring a longest processing time and to another of the instruction address registers for a second continuous period of M instruction clocks for a job requiring a second longest processing time, where N and M are both integers and N>M.

2. The digital signal processing apparatus according to claim 1 further comprising two or more data address registers which are associated with the data memory for separately supplying data address data for different jobs and wherein the data address registers have inputs and outputs and the switching means cyclicly connects the outputs of the two or more data address registers, one at a time, to the data memory in accordance with the predetermined pattern of instruction clocks to cyclicly supply data address data for a current job and then one or more previous jobs to the data memory to enable processing by the computing block to be cyclicly switched between the current job and the one or more previous jobs.

3. The digital signal processing apparatus according to claim 1 wherein the computing block has inputs and an output and two or more computed data registers which are associated with the computing block for storing and then supplying computed data and wherein the computed data registers have inputs connected to the output of the computing block and outputs which are cyclicly connected by the switching means, one at a time, to one of the inputs of the computing block to cyclicly supply computed data for a current job and then one or more previous jobs to the computing block in accordance with the predetermined pattern of instruction clocks to enable processing by the computing block to be cyclicly switched between the current job and the one or more previous jobs.

4. The digital signal processing apparatus according to claim 1, further comprising a coefficient memory and two or more coefficient address registers which are associated with the coefficient memory for supplying coefficient address information for different jobs and wherein the two or more coefficient address registers are cyclicly connected with the coefficient memory by the switching means, one at time, in accordance with the predetermined pattern of instruction clocks to cyclicly supply coefficient address data for a current job and then one or more previous jobs to the coefficient memory to enable processing by the computing block to be cyclicly switched between the current job and the one or more previous jobs.

5. A digital signal processing apparatus for simultaneously processing two jobs and comprising at least a computing block which operates according to instruction clocks cyclicly supplied from a source, a data memory connected to the computing block for supplying data to the computing block, an instruction memory connected to the data memory and the computing block for supplying address instructions to the data memory and the computing block for processing the two jobs and wherein the improvement comprises:

(a) two instruction address registers for respectively storing job processing instruction addresses for a current job and a previous job; and (b) switching means supplied with the instruction clocks for cyclicly connecting one of the instruction address registers at a time to the instruction memory according to a predetermined, cyclical pattern of the instruction clocks for cyclicly supplying the job processing instruction addresses to the instruction memory for a current job and then a previous job to enable job processing to be cyclicly switched between a current job and, wherein the jobs to be processed require different processing times and further wherein the predetermined pattern of instruction clocks is selected so that the switching means connects the instruction memory to a first one of the instruction address registers for a first continuous period of N instruction clocks for a job requiring a longest processing time and to a second one of the instruction address registers for a second continuous period of M instruction clocks for a job requiring a second longest processing time, where N and M are both integers and N>M.

6. The digital signal processing apparatus according to claim 5 and further comprising two data address registers for storing and outputting data addresses for the current job and the previous job, respectively, which are cyclicly connected to the data memory by the switching means, one at a time, in accordance with the predetermined pattern of instruction clocks for cyclicly supplying data addresses for the current job and then the previous job to the computing block to enable job processing to be cyclicly switched between the current job and the previous job.

7. The digital signal processing apparatus according to claim 6 wherein the data address registers each have a separate input and an output and wherein the data memory includes an address generator which is cyclicly connected by the switching means in accordance with the predetermined pattern of instruction clocks between the output of one of the data address registers and then the output of another of the data address registers for cyclicly generating a new address and supplying the new address to the data memory and to the inputs of the data address registers as a reference address.

8. The digital signal processing apparatus according to claim 10 wherein the computing block has inputs and an output and further comprising computed data registers for separately storing and outputting job processing data for the current job and the previous job, respectively, and having separate inputs connected to the output of the computing block and separate outputs which are cyclicly connected, one at a time, by the switching means to one of the inputs of the computing block in accordance with the predetermined pattern of instruction clocks.

9. The digital signal processing apparatus according to claim 5 further comprising a coefficient memory and two coefficient address registers for separately storing and outputting coefficient addresses for the current job and the previous job, respectively, which are cyclicly connected to the coefficient memory by the switching means, one at a time, in accordance with the predetermined pattern of instruction clocks for cyclicly supplying coefficient addresses for the current job and then the previous job to the coefficient memory to enable job processing to be cyclicly switched between the current job and the previous job.

* * * * *